(12) United States Patent
Brundridge et al.

(10) Patent No.: US 10,430,562 B2
(45) Date of Patent: Oct. 1, 2019

(54) SYSTEM AND METHOD FOR EXTRACTING DEVICE UNIQUENESS TO ASSIGN A LICENSE TO THE DEVICE

(71) Applicant: DELL PRODUCTS, LP, Round Rock, TX (US)

(72) Inventors: Michael Brundridge, Fredericksburg, TX (US); Sruthi Mothukupally, Cedar Park, TX (US); Darrell Rosser, Round Rock, TX (US); Gang Liu, Austin, TX (US); Jason C. Dale, Cedar Park, TX (US); Marshal F. Savage, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 15/466,327

(22) Filed: Mar. 22, 2017

(65) Prior Publication Data
US 2017/0193202 A1  Jul. 6, 2017

Related U.S. Application Data

(63) Continuation of application No. 13/157,714, filed on Jun. 10, 2011, now Pat. No. 9,614,678.

(51) Int. Cl.
*G06F 21/10* (2013.01)
*H04L 9/32* (2006.01)

(52) U.S. Cl.
CPC .......... *G06F 21/105* (2013.01); *G06F 21/10* (2013.01); *H04L 9/3247* (2013.01); *H04L 2209/68* (2013.01); *H04L 2463/103* (2013.01)

(58) Field of Classification Search
None
See application file for complete search history.

(56) References Cited

U.S. PATENT DOCUMENTS

| | | | |
|---|---|---|---|
| 6,785,726 B1 | 8/2004 | Konetski et al. | |
| 7,058,641 B1 | 6/2006 | Franz | |
| 7,237,090 B1 * | 6/2007 | Hudepohl | G06F 9/3802 712/34 |
| 7,484,103 B2 | 1/2009 | Woo et al. | |
| 7,493,497 B1 * | 2/2009 | Tan, Jr. | G06F 21/602 380/277 |
| 7,865,445 B2 * | 1/2011 | Maeda | G06F 21/105 235/379 |
| 8,108,667 B2 * | 1/2012 | Mittapalli | G06F 9/4411 713/1 |
| 8,150,953 B2 * | 4/2012 | Mittapalli | H04L 49/25 709/223 |

(Continued)

*Primary Examiner* — Lynn D Feild
*Assistant Examiner* — Richard A McCoy
(74) *Attorney, Agent, or Firm* — Larson Newman, LLP

(57) ABSTRACT

An information handling system includes a device, a controller, and a license manager subsystem. The controller is configured to determine whether the device has a license assigned and to extract a unique identification for the device in response to a request for information about the device. The license manager subsystem is configured to send the request for information about the device to the controller, to send the unique identification for the device to a license server as a request for the license for the device, to receive the license from the license server, and to assign the license to the device when the license is received.

20 Claims, 8 Drawing Sheets

(56) References Cited

U.S. PATENT DOCUMENTS

| | | | |
|---|---|---|---|
| 8,156,540 B2* | 4/2012 | Jaber | G06Q 30/00 709/203 |
| 8,438,543 B2* | 5/2013 | Carbone | G06F 8/60 717/120 |
| 8,533,253 B2* | 9/2013 | McCoy | G06F 9/54 370/310 |
| 9,614,678 B2* | 4/2017 | Brundridge | H04L 9/3247 |
| 2002/0136405 A1 | 9/2002 | Hori | |
| 2003/0125975 A1 | 7/2003 | Danz et al. | |
| 2003/0130953 A1 | 7/2003 | Narasimhan et al. | |
| 2003/0202008 A1 | 10/2003 | McDonald et al. | |
| 2004/0039594 A1 | 2/2004 | Narasimhan et al. | |
| 2004/0117784 A1 | 6/2004 | Endoh | |
| 2005/0004873 A1 | 1/2005 | Pou et al. | |
| 2005/0076208 A1* | 4/2005 | Hori | G06F 21/10 713/165 |
| 2005/0114265 A1 | 5/2005 | Satkunanathan et al. | |
| 2005/0228877 A1 | 10/2005 | Monitzer et al. | |
| 2005/0289072 A1 | 12/2005 | Sabharwal | |
| 2006/0015540 A1 | 1/2006 | Takeda et al. | |
| 2006/0026105 A1 | 2/2006 | Endoh | |
| 2006/0095382 A1 | 5/2006 | Mahlbacher | |
| 2006/0106728 A1* | 5/2006 | Yellai | G06F 21/105 705/59 |
| 2006/0112175 A1 | 5/2006 | Sellers et al. | |
| 2006/0143575 A1 | 6/2006 | Sauermann | |
| 2006/0155620 A1 | 7/2006 | Tsurubayashi et al. | |
| 2006/0179058 A1* | 8/2006 | Bram | G06F 21/121 |
| 2006/0239451 A1 | 10/2006 | Evans et al. | |
| 2006/0287961 A1 | 12/2006 | Mori et al. | |
| 2006/0288422 A1 | 12/2006 | Liu et al. | |
| 2007/0067301 A1 | 3/2007 | Malik | |
| 2007/0124603 A1 | 5/2007 | Yamamichi et al. | |
| 2007/0182973 A1 | 8/2007 | Godley | |
| 2007/0280235 A1* | 12/2007 | Chen | H04H 60/14 370/390 |
| 2008/0010207 A1* | 1/2008 | Yanagihara | H04L 9/0836 705/51 |
| 2008/0027870 A1 | 1/2008 | Nam et al. | |
| 2008/0071688 A1 | 3/2008 | Corbell et al. | |
| 2008/0148253 A1* | 6/2008 | Badwe | G06F 21/10 717/174 |
| 2008/0228513 A1* | 9/2008 | McMillan | G06F 21/105 705/1.1 |
| 2008/0256349 A1* | 10/2008 | Dennis | G06F 21/121 713/1 |
| 2008/0256644 A1 | 10/2008 | Lee et al. | |
| 2008/0306986 A1 | 12/2008 | Doyle, Sr. | |
| 2009/0007221 A1 | 1/2009 | Kim | |
| 2009/0043866 A1 | 2/2009 | Lee et al. | |
| 2009/0083760 A1* | 3/2009 | Slaight | G06F 13/4022 719/313 |
| 2009/0132403 A1 | 5/2009 | Titus et al. | |
| 2009/0183010 A1* | 7/2009 | Schnell | G06F 21/10 713/193 |
| 2009/0205055 A1* | 8/2009 | Savov | G06F 21/10 726/31 |
| 2009/0249494 A1 | 10/2009 | Disciascio et al. | |
| 2009/0276856 A1* | 11/2009 | Pichetti | G06F 21/10 726/26 |
| 2010/0031310 A1 | 2/2010 | Konetski et al. | |
| 2010/0088132 A1 | 4/2010 | Parkes et al. | |
| 2010/0241568 A1* | 9/2010 | Yellai | G06F 21/10 705/59 |
| 2010/0325735 A1* | 12/2010 | Etchegoyen | G06F 21/121 726/26 |
| 2010/0333213 A1* | 12/2010 | Etchegoyen | G06F 21/105 726/29 |
| 2012/0047309 A1* | 2/2012 | Natu | H04L 63/101 710/314 |
| 2012/0158890 A1* | 6/2012 | Jreij | G06F 11/0784 709/217 |
| 2012/0311155 A1* | 12/2012 | Schmidt | G06F 21/105 709/226 |
| 2013/0031236 A1* | 1/2013 | Shah | H04L 41/0273 709/223 |
| 2013/0340092 A1* | 12/2013 | Kamphuis | G06F 21/105 726/27 |

* cited by examiner

SYSTEM AND METHOD FOR EXTRACTING DEVICE UNIQUENESS TO ASSIGN A LICENSE TO THE DEVICE

CROSS-REFERENCE TO RELATED APPLICATION

This application is a continuation of U.S. patent application Ser. No. 13/157,714, entitled "System and Method for Extracting Device Uniqueness to Assign an License to the Device," filed on Jun. 10, 2011, the disclosure of which is hereby expressly incorporated by reference in its entirety.

FIELD OF THE DISCLOSURE

This disclosure generally relates to information handling systems, and more particularly relates to a system and method for extracting device uniqueness to assign a license to the device.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

An information handling system, such as a server, can include a network interface card, a host bus adaptor, a redundant array of independent disks, a controller, and the like. Each of these devices may have a different manufacturer that can require a user of the server to acquire a license before using the device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
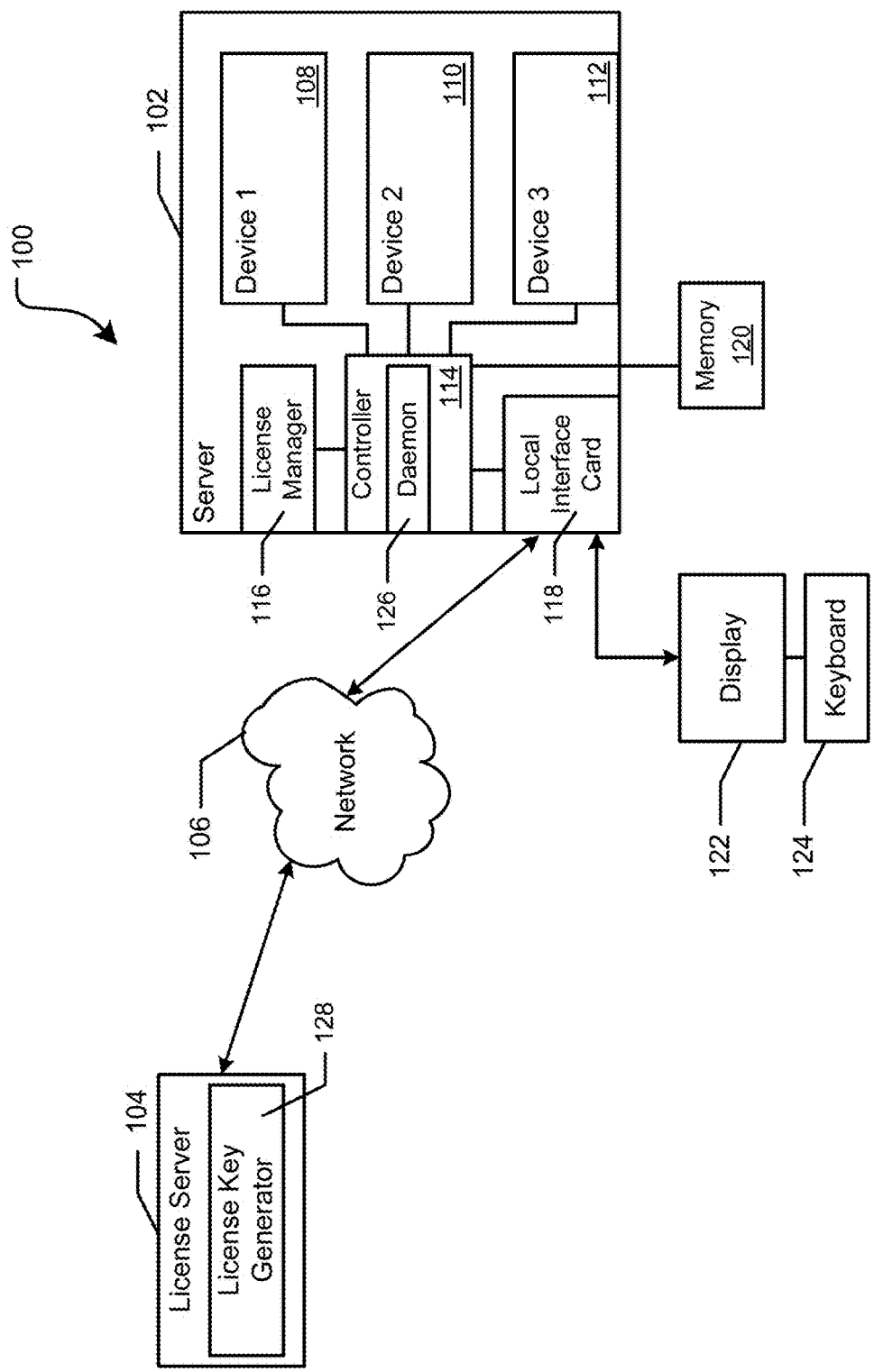
FIG. 1 is a block diagram of a licensing system for an information handling system.

FIG. 1 illustrates a block diagram of a licensing system 100 for an information handling system. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The licensing system 100 includes a server 102, which communicates with a license server 104 via a network 106. The server 102 includes devices 108, 110, and 112, a controller 114, a license manager (LM) subsystem 116, and a local interface card 118. The controller 114 is in communication with the devices 108, 110, and 112, with the LM subsystem 116, with the local interface card 118, and with a memory 120. The memory 120 can be external to the server 102, or can be located within the server. The local interface card 118 can communicate with a local display 122 and with a local keyboard 124.

The local interface card 118 can be an integrated keyboard, video, and mouse (iKVM) interface card that can provide a local user with access to each of the devices 108, 110, and 112. The controller 114 can be any type of controller, such as an integrated Dell Remote Access Controller (iDRAC), which is an interface card that can provide out-of-band management of the servers 108, 110, or 112. The controller 114 can have a processor, a memory, a battery, a network connection, and access to a server chassis bus. The controller 114 can provide different functions for the server 102 such as power management, virtual media access, and remote console capabilities. A local user can utilize the local interface card 118, the local display 122, and the keyboard 124 to communicate with the controller 114 and the LM subsystem 116 to access, configure, or assign a license to one of the devices 108, 110, and 112, and the controller 114.

The devices 108, 110, and 112 in the server 102 can be each manufactured by different vendors that may require the user to receive a license to use the device. When the server 102 is turned on, the LM subsystem 116 can communicate with a daemon process 126 of the controller 114, via an application programming interface (API), to request information about the devices in the server, and whether each of the devices has been assigned a license. The daemon process 126 can then communicate with the devices 108, 110, and 112 to extract a unique identification (ID) for each of the devices, such as a peripheral component interconnect (PCI) ID string. The daemon process 126 can then determine whether a license is assigned to each of the devices 108, 110, and 112.

The daemon process 224 can then return the unique ID for each of the devices 108, 110, and 112 that is not assigned a license to the LM subsystem 116, which in turn can send the unique ID for each of the devices to the license server 104 to request a license for the device. The license server 104 includes a license key generator (LKG) 128, which can generate the license for a specific device based on the unique ID of the device. For example, the LKG 128 can determine whether the unique ID of a device is a proper unique ID. If the unique ID is proper, the LKG 128 can generate the license, and can sign the license with a signature. The signature can be an encrypted signature in an extensible markup language (XML) format, or the like. The license server 104 can also include the unique ID of the device within the license, such that the unique ID of the license can be matched with a unique ID of a device.

The LKG 128 can also include other restrictions on the license based on licensing requirements of the manufacturer of the device. The other restrictions can be that the license is bound to a specific platform, that the license is bound to a service tag or to the unique ID, that the license has a time constraint, or the like. Binding the license to a specific platform can cause the license to be valid only for a specific system ID, such as an ID associated with the server 102. Binding the license to a specific platform can also cause the license to be valid only for a specific platform generation, such as a specific operating system generation. Binding the license to a service tag or unique ID can cause the license to be valid only for a device that has a service tag or unique ID that matches the unique ID of the license. The time constraint for the license can limit the license to a specific amount of time, indicate a start date and/or an end date of the license, indicate that the license is valid during an evaluation period, or the like.

The license server 104 can send the license to the LM subsystem 116 with the license being embedded in an email, via a web portal interface, via a license management tool, or the like. When the LM subsystem 116 has received the license, the LM subsystem can store the license in a local storage medium, such as the memory 120. The user can utilize the LM subsystem 116 to access a licensing graphical user interface (GUI) 202, as shown in FIG. 2, to import and save a license to one or more of the devices 108, 110, and 112 within the server 102.

Figure 2:
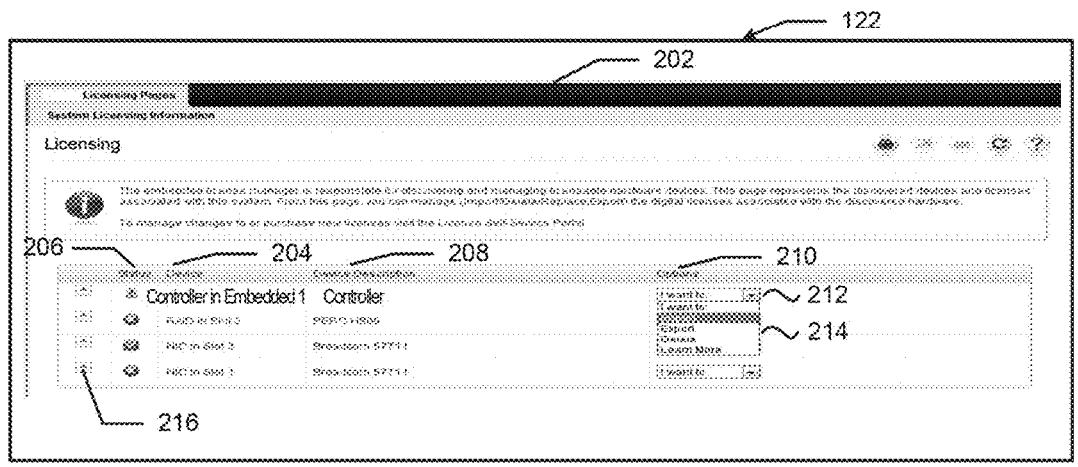
FIGS. 2-6 are exemplary screen shots of a licensing graphical user interface for assigning a license to the information handling system.

FIG. 2 shows the display 122 including the licensing GUI 202, which in turn includes a device field 204, a status field 206, a device description field 208, and an options field 210. The options field 210 can include a drop down menu 212, which can include actions 214, such as import a license, export a license, delete a license, learn more, and the like.

The device field 204 can include a type of device and the location of the device in the server, such as controller in embedded location 1, a redundant array of independent disks (RAID) in slot 2, a network interface card (NIC) in slot 3, a NIC in slot 1, and the like. The status 206 can be an "!" icon indicating a warning message, a check mark icon indicating a healthy device with an assigned license, an "X" icon indicating an error message, and the like.

For example, the status 206 for the controller 114 can indicate that the controller does not have a license assigned. The user can then select one of the actions 214 from the drop down menu 212 for the controller 114, such as to import a license. When the action 214 has been selected, the licensing GUI 202 can expand a field for that device such that a file text box 302, a browse button 304, an apply button 306, and a cancel button 308 can be inserted into the licensing GUI as shown in FIG. 3.

Figure 3:
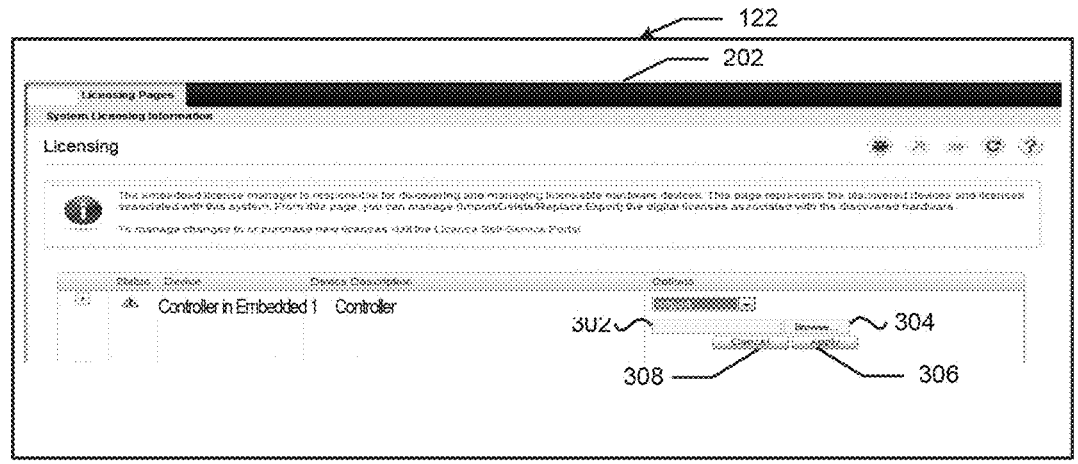

FIG. 3 shows the file input text box 302, the browse button 304, the apply button 306, and the cancel button 308 immediately under the drop down menu 212. If the user decides not to import a license for the controller 114, the user can select the cancel button 306. However, if the user decides to import the license, the user can then select the browse button 304, which in turn can open an operating system (OS) file browser 402 as shown in FIG. 4.

Figure 4:
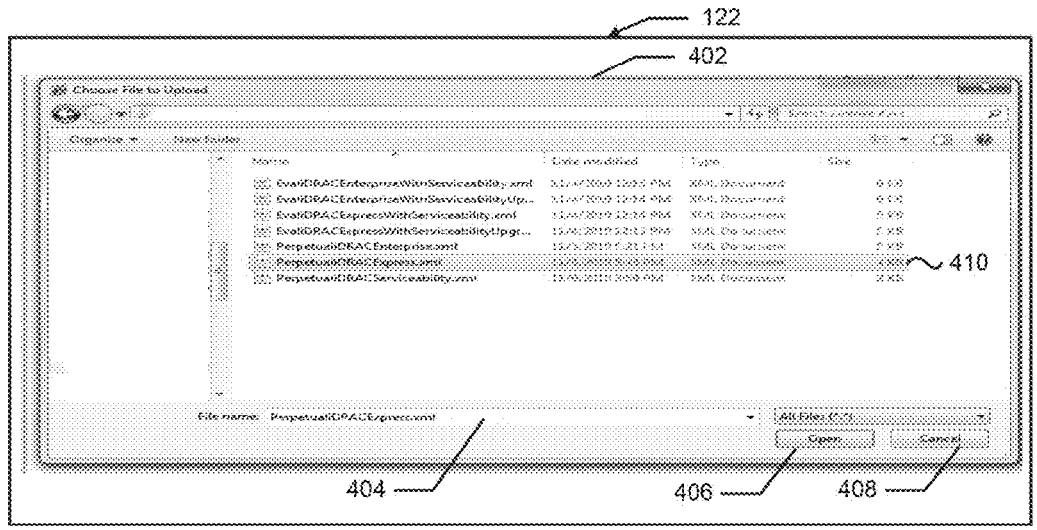

FIG. 4 shows the OS file browser 402 including a file name text box 404, an open button 406, and a cancel button 408. The user can highlight and select a license file 410 to import by clicking on the desired license file. The user can then press the open button 406, which can cause a file name of the license file 410 to be copied into the file name text box 404. However, if the user presses the cancel button 408, the file name text box 404 can be cleared. Either action by the user can cause the OS file browser 402 to close and can cause the licensing GUI 202 to be displayed again.

Figure 5:
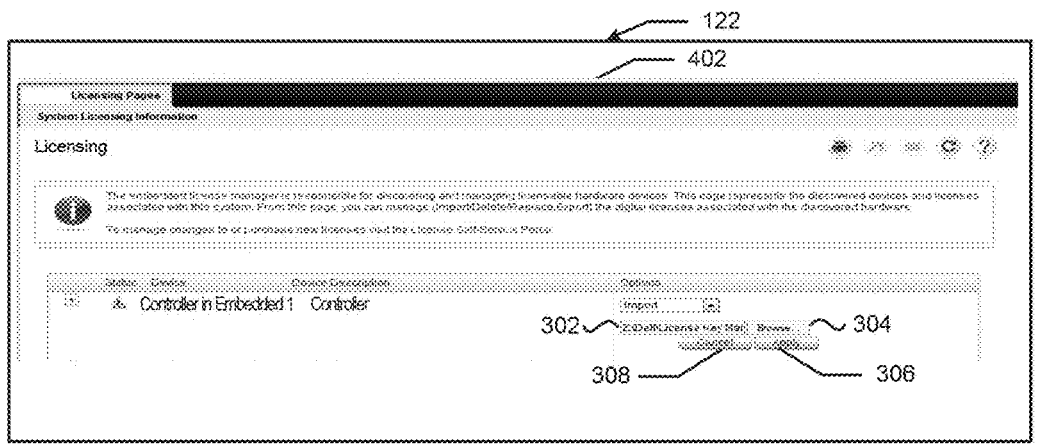

If the user selects the open button 406, the file information for the license file 410 can be copied into the file input text box 302 as shown in FIG. 5. The user can then click the apply button 306 to assign the license to the device, such as the controller 114. The user can also select the cancel button 308 to cancel the operation. However, if the user selects the apply button 306, the LM subsystem 116 can then attempt to assign the license to the controller 114. When the license is imported for a device existing in the server 102, the LM subsystem 116 can verify the encrypted signature for the license, verify that the device is valid, and determine whether the license is bound. If the license is bound to a unique ID, the LM subsystem 116 can verify the device by comparing the unique ID of the device with the unique ID in the license.

Referring back to FIG. 2, the user can also utilize the licensing GUI 202 to delete a previously assigned license from device 108, 110, or 112. If the user decides to delete a license, the user can select the delete action 214 from the drop down menu 212. When the delete action 214 has been selected, the license file can be removed from the device 108, 110, or 112, and the license file can become unassigned.

Some of the devices 108, 110, and 112 may have more than one license assigned to the device. When the user is deleting a license from a device, the user can determine if a single license or all licenses need to be deleted from the device. If all licenses should be deleted, the user can select delete from the drop down menu 212 in FIG. 2. Otherwise, if an individual license is to be deleted, the user can select to view an expanded license view 602 for the device by selecting the "+" icon 216 in the licensing GUI 202 to display an expanded license view 602 as shown in FIG. 6.

Figure 6:
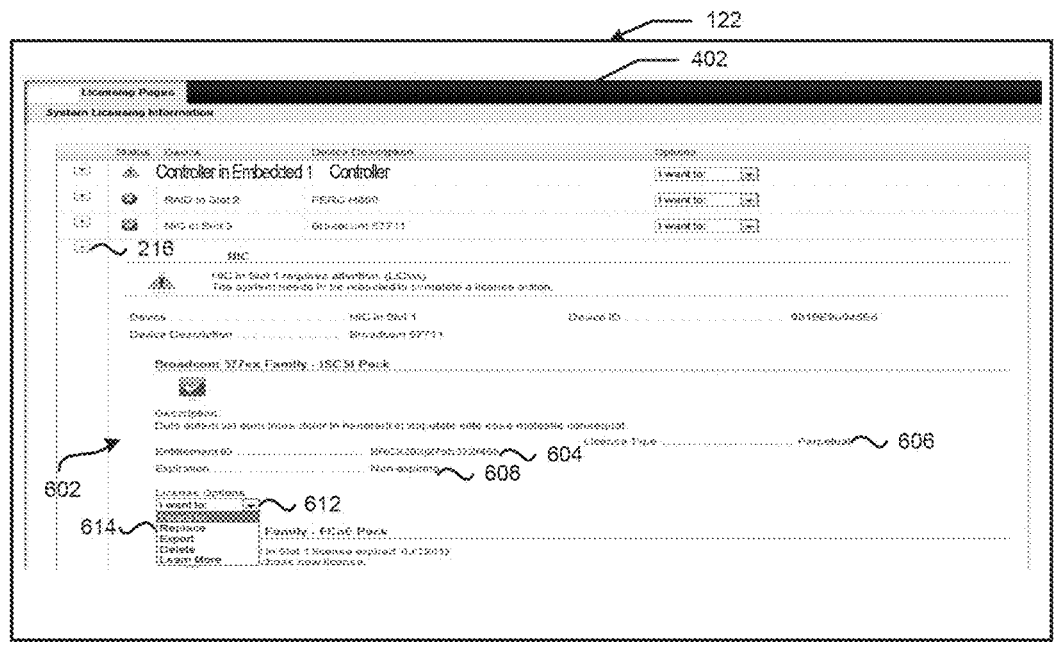

FIG. 6 shows the expanded license view 602 including a license entitlement ID 604, a license type 606, a license expiration 608, a license options drop down menu 612, and license actions 614. The license entitlement ID 604 can be a unique ID given to the license when issued by a service provider, and the license entitlement ID may be equivalent to a serial number. In an embodiment, the license entitlement ID 604 may not be replicated on any two licenses issued by the service provider. The license type 606 can define the license type of the license, such as perpetual, evaluation, lease, site, or the like. The expanded license view 602 can also include a brief description of the license, which can be extracted from a product description stored in the license file. The license expiration 608 can list when the license expires. For example, if the license is an evaluation license, the license expiration 608 can be expressed in number of days remaining in the evaluation period. If the license is a leased license, the license expiration 608 can be expressed as an end date for the license. However, if the license is perpetual, the license expiration 608 can list non-expiring as the expiration period.

When a license is assigned to a device, such as the device 108, the device can store information about the license in a memory of the device. If the user wants to revoke or delete the license from the device 108, the user can select the delete action 614 for the license of the device. The LM subsystem 116 can then issue a revoke command to the device 108, which in turn causes the device to delete the license and other information about the license from the memory in the device. When the license has been removed from the device 108, the LM subsystem 116 can delete the license from a datastore of the LM subsystem.

If no other licenses are installed on the device 108, the controller 114 may only allow functions for the base product for the device until another license is assigned to the device that turns on additional features, evaluation periods, upgrades, or the like. In an embodiment, if the device 108 becomes unusable, such as if the device breaks, is removed, or the like, the license may be deleted from the server 102 and reapplied to a similar device on another server unless the license is bound to the server or to the device.

Another action the user may want to perform is to replace an existing license assigned to the device 108 with a new license. For example, the user may want to extend an evaluation license, replace an evaluation license with a purchased license, replace an expiring type license with an extension or a perpetual non-expiring license, or the like. The LM subsystem 116 can first receive an upgraded/updated license from one of several methods, such as the license being embedded in an email, via a web portal interface, via a license management tool, or the like. When the upgraded/updated license has been received and the LM subsystem 116 has stored the license on a local storage medium, the user can use the licensing GUI 202 and the expanded license view 602 to replace the license file from the local storage medium to the datastore of the LM subsystem.

The user can determine which device, such as device 108, has a license that should be replaced, and can then select "+" icon next to the device to display the expand license view 602 of the licensing GUI 202. The user can then select the replace action 614 from the drop down menu 612 for the license that is to be replaced. The user can then perform the steps for importing a license described above with respect to FIG. 2-5.

Another action that the user can perform is to export a license to an external storage medium, such as the memory 120. To export the license, the user can select the export action 214 from the drop down menu 212, or can select the export action 614 from the drop down menu 612. A file save dialog box can be displayed in response to the user selecting the export action. The LM subsystem 116 can then assign a file name consisting of the device ID and license entitlement ID to the license file in the external storage medium.

Figure 7:
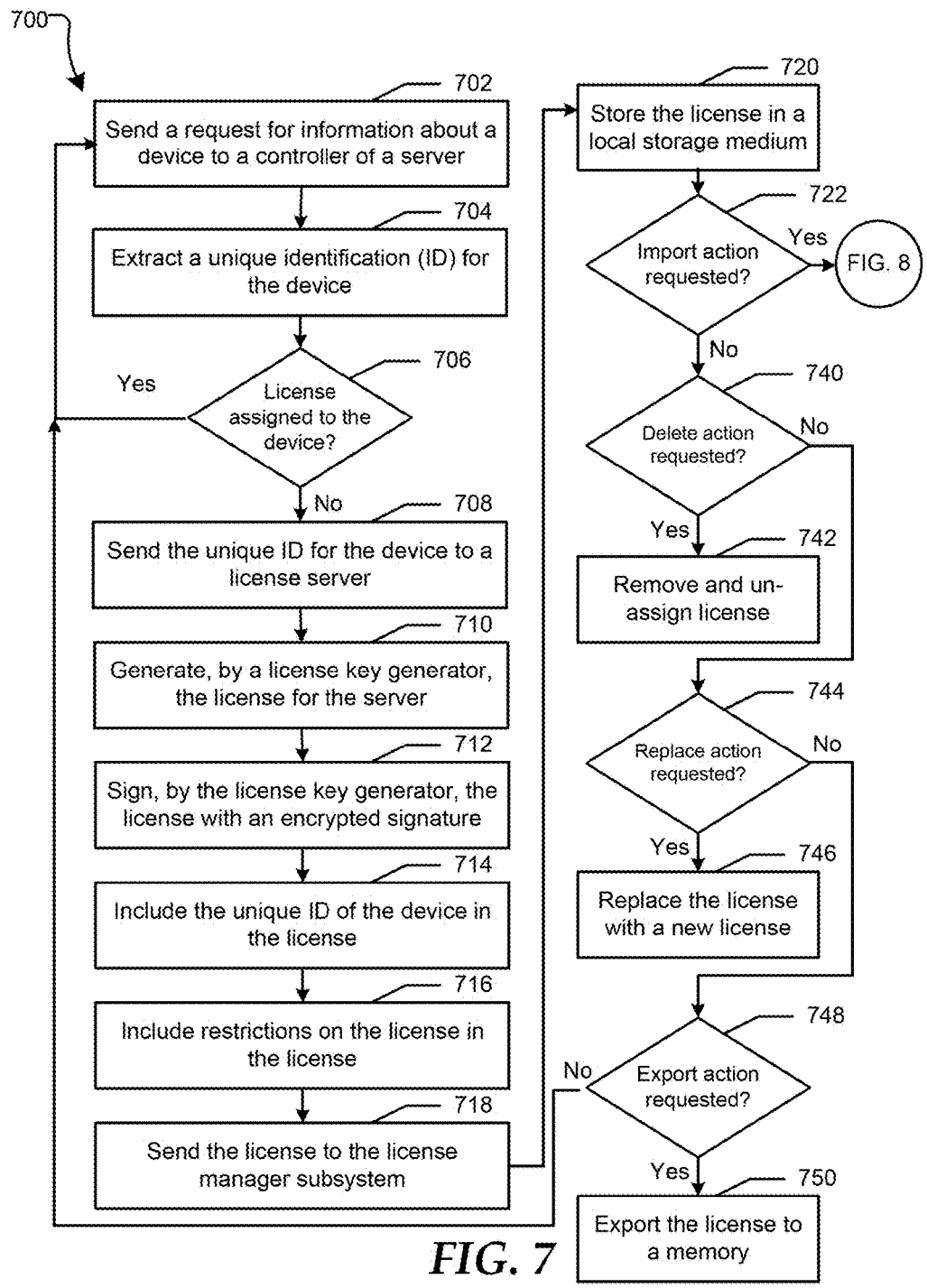
FIGS. 7 and 8 are a flow diagram of a method for assigning a license to the information handling system.
Figure 8:
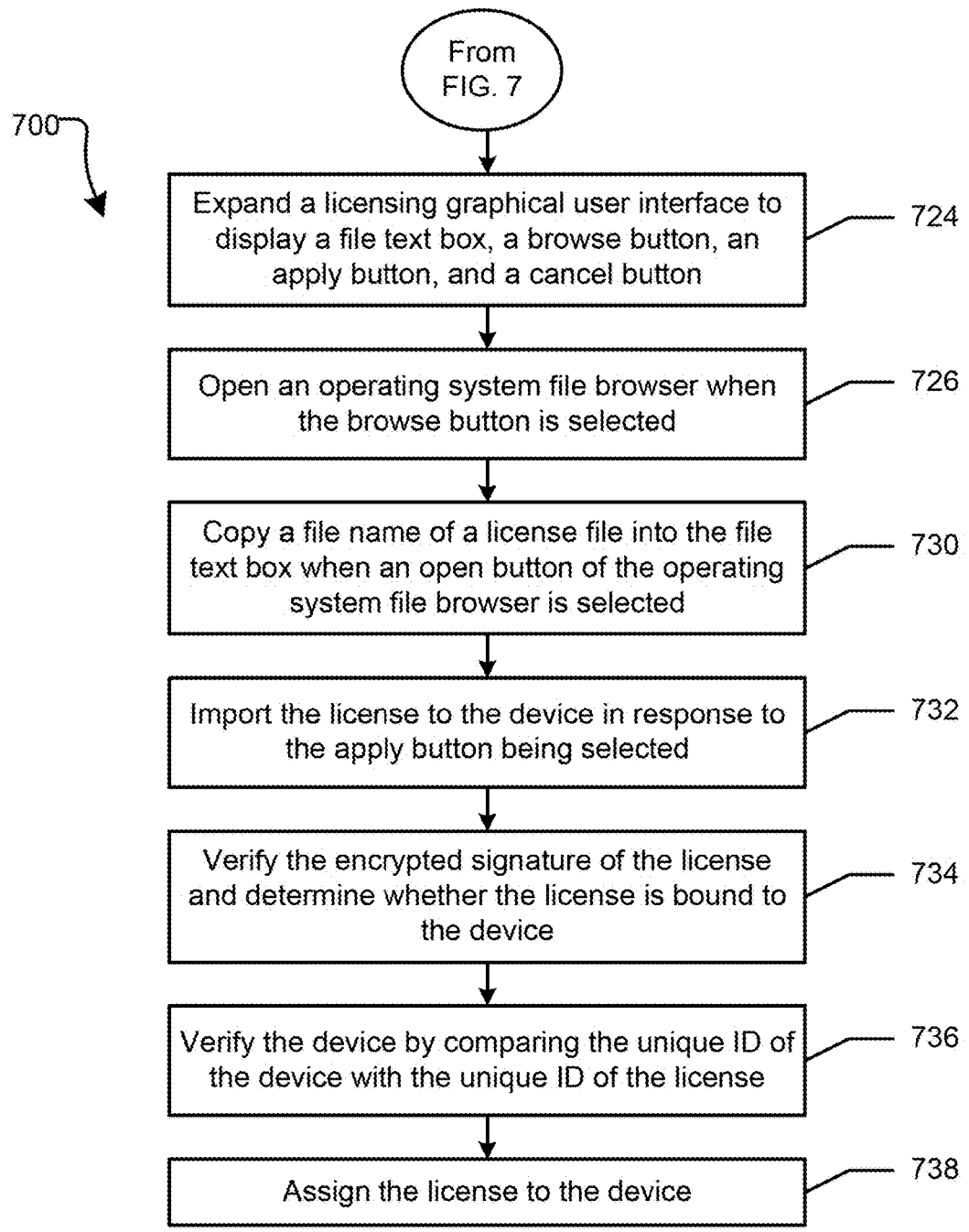

FIGS. 7 and 8 illustrate a method 700 for assigning a license to the server. At block 702, a request is sent from a license manager (LM) subsystem to a daemon process of a controller, via an application programming interface (API) when a server is turned on. The request can be for information about a device in the server, and whether each of the devices has a license assigned. A unique identification (ID) for the device is extracted by controller in response to the request at block 704. The unique ID can be a peripheral component interconnect (PCI) ID string. At block 706, a determination is made whether a license is assigned to each of the devices.

If a license is not assigned to the device, the unique ID for the device is returned the to the LM subsystem and the unique ID for the device is sent from the LM subsystem to a license server to request the license for the devices at block 708, otherwise the flow repeats as stated above at block 702. The license for the device is generated by a license key generator based on the unique ID of the specific device at block 710. At block 712, the license is signed with an encrypted signature. The encrypted signature can be in an extensible markup language (XML) format, or the like. The unique ID of the device is included within the license at block 714.

At block 716, restrictions on the license are included in the license based on licensing requirements of a manufacturer of the device. The other restrictions can be that the license is bound to a specific platform, that the license is bound to a service tag or the unique ID, that the license has a time constraint, or the like. Binding the license to a specific platform can cause the license to be valid only for a specific system ID, such as an ID associated with the server. Binding the license to a specific platform can also cause the license to be valid only for a specific platform generation, such as a specific operating system generation. Binding the license to a service tag or unique ID can cause the license to be valid only for a device that has service tag or unique ID that matches the unique ID of the license. The time constraint for the license can limit the license for a specific amount of time, indicate a start date and/or and end date of the license, indicate that the license is valid during an evaluation period, or the like.

At block 718, the license is sent to the LM subsystem. The license can be sent via the license being embedded in an email, via a web portal interface, via a license management tool, or the like. The license is stored in a local storage medium in response to the LM subsystem receiving the license at block 720. At block 722, a determination is made whether an import action is requested for a device in the server via a licensing GUI. If an import action is not request the flow continues at block 740, otherwise the licensing GUI is expanded to display a file text box, a browse button, an apply button, and a cancel button at block 724.

At block 726, an operating system (OS) file browser is opened when the browse button is selected. A license file is highlighted and selected at block 728. The license file is highlighted and selected by a user clicking on the license file. At block 730, a file name of the license file is copied into the file text box of the licensing GUI when an open button of the OS file browser is selected. The license is imported for the device in response to the apply button being selected at block 732.

At block 734, the encrypted signature of the license is verified and determination is made that the license is bound to the device. The device is verified by comparing the unique ID of the device with the unique ID in the license at block 736. At block 738, the imported license is assigned to the specific device.

At block 740, a determination is made whether a delete action is selected. If the delete action has been selected, the license file is removed from the specific device and the license file is un-assigned at block 742. If the delete action is not selected, a determination is made whether a replace action is selected at block 744. If the replace action is selected a new license can be assigned to the specific device at block 746. The new license can extend an evaluation license, replace an evaluation license with a purchased license, replace an expiring type license with an extension or a perpetual non-expiring license, or the like. If the replace action is not selected, a determination is made whether an export action is selected at block 748. If the export action is selected the license is sent to a memory at block 750. The memory may be external to the server, internal to the server, or the like.

Figure 9:
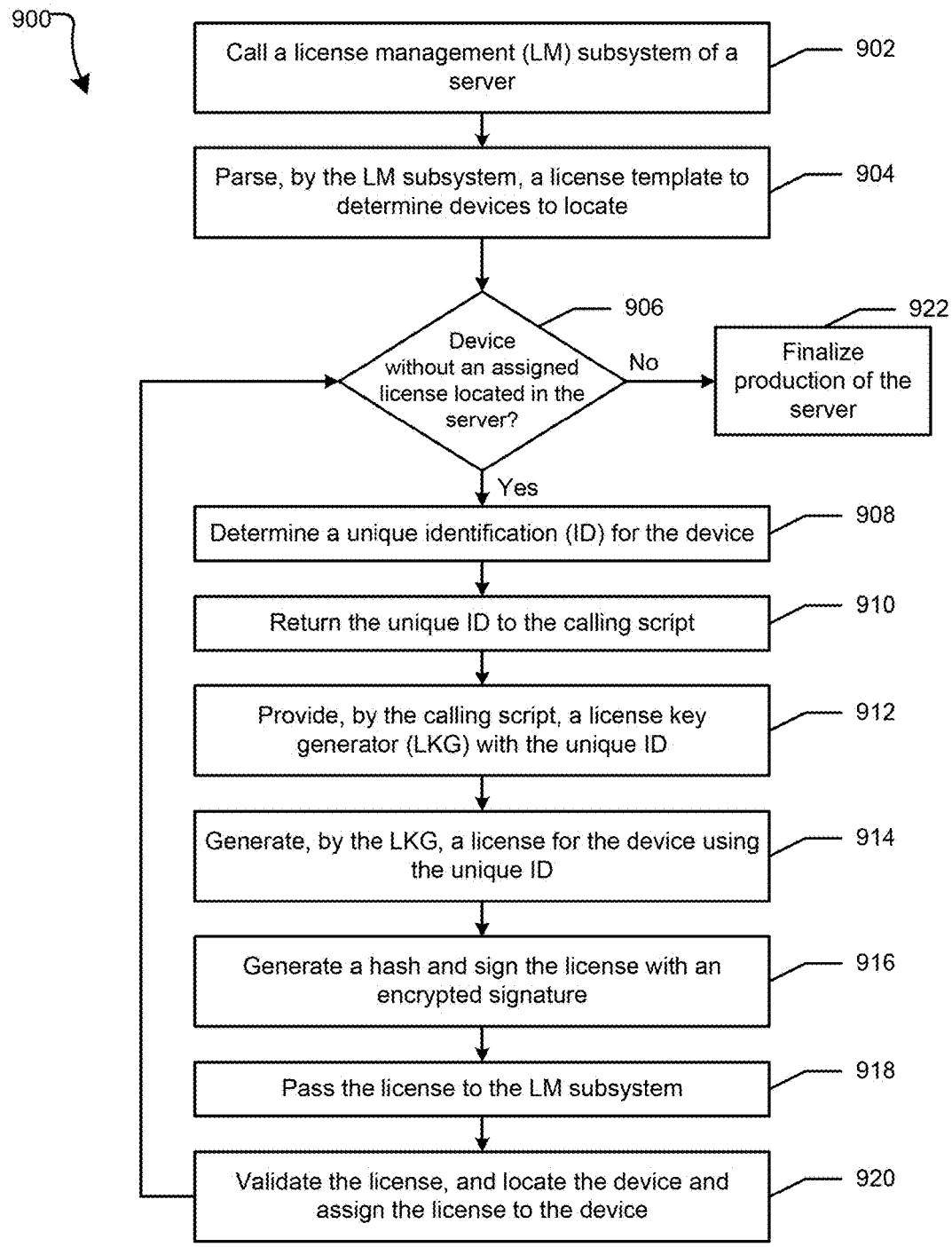
FIG. 9 is a flow diagram of a method for assigning a license to the information handling system at a point of sale.

FIG. 9 illustrates a method 900 for assigning licenses to devices within a server at a point of sale. At block 902, a license manager (LM) subsystem of the server is called by a factory process. The factory process can be near the end of the manufacturing of the server after a user has purchased the server. The user may have requested that different devices within the server be assigned a license so that the user can perform different functions with the device immediately upon receiving the server. The devices can include a controller, a redundant array of independent disk (RAID), a network interface card (NIC), and the like for the server. At block 904, a license template is parsed by the LM subsystem to determine what device to locate. The license template can include a type of license, a time period for the license, whether the license is bound to the server or the device, or the like.

At block 906, a determination is made whether a device without an assigned license is located in the server. The device can be located by matching a peripheral component interconnect (PCI) identification (ID) for the device. If a device without an assigned license is located in the server, a unique ID is determined for the device at block 908. The unique ID can be determined and then sent to the LM subsystem as part of a comprehensive embedded management (CEM) license application programming interface (API). Additionally, the unique ID can be assigned to the device by a vendor of the device, such as a media access control (MAC) address for a NIC, world wide name (WWN) for a host bus adaptor (HBA), and the like.

At block 910, the unique ID is returned, by the LM subsystem, to the calling script of the factory process. A license key generator (LKG) is provided with the unique ID by the calling script at block 912. In an embodiment, the LKG can be a microprocessor, a general processor, or the like. At block 914, a license is generated by the LKG for the device using the unique ID. A hash is generated and the license is signed with an encrypted signature at block 916. At block 918, the license is passed to the LM subsystem. The license is validated, by the LM subsystem, based on the hash and the encrypted signature, and the device is located and assigned the license at block 920. The flow then repeats at block 906, such that the determination is made whether another device without an assigned license is located in the server. If another device is located without a license, the flow continues as stated above at block 908. If no device is located without a license the production of the server is finalized at block 922.

Figure 10:
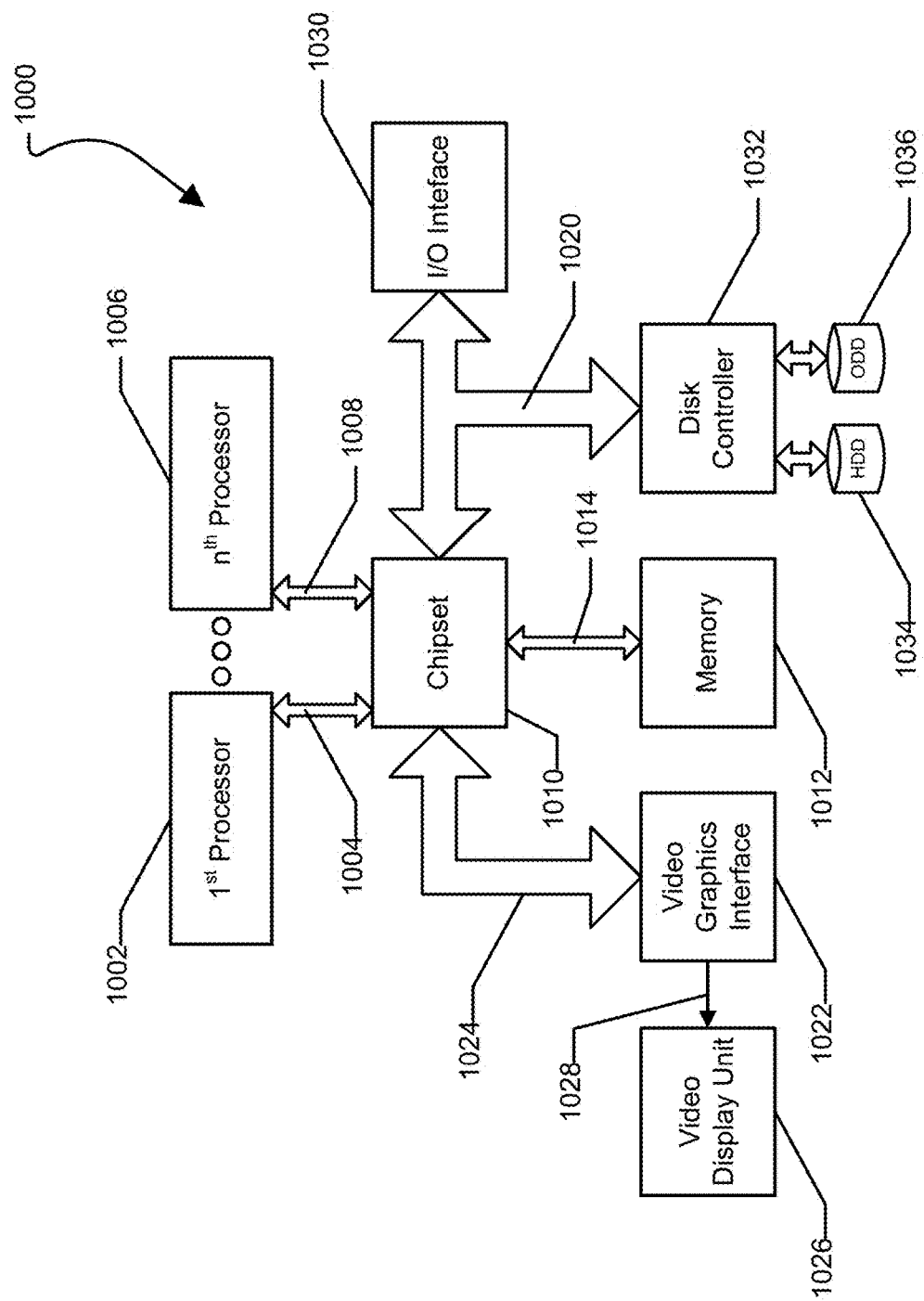
FIG. 10 is a block diagram of a general information handling system.

As shown in FIG. 10, the information handling system 1000 can include a first physical processor 1002 coupled to a first host bus 1004 and can further include additional processors generally designated as $n^{th}$ physical processor 1006 coupled to a second host bus 1008. The first physical processor 1002 can be coupled to a chipset 1010 via the first host bus 1004. Further, the $n^{th}$ physical processor 1006 can be coupled to the chipset 1010 via the second host bus 1008. The chipset 1010 can support multiple processors and can allow for simultaneous processing of multiple processors and support the exchange of information within information handling system 1000 during multiple processing operations.

According to one aspect, the chipset 1010 can be referred to as a memory hub or a memory controller. For example, the chipset 1010 can include an Accelerated Hub Architecture (AHA) that uses a dedicated bus to transfer data between first physical processor 1002 and the $n^{th}$ physical processor 1006. For example, the chipset 1010, including an AHA enabled-chipset, can include a memory controller hub and an input/output (I/O) controller hub. As a memory controller hub, the chipset 1010 can function to provide access to first physical processor 1002 using first bus 1004 and $n^{th}$ physical processor 1006 using the second host bus 1008. The chipset 1010 can also provide a memory interface for accessing memory 1012 using a memory bus 1014. In a particular embodiment, the buses 1004, 1008, and 1014 can be individual buses or part of the same bus. The chipset 1010 can also provide bus control and can handle transfers between the buses 1004, 1008, and 1014.

According to another aspect, the chipset 1010 can be generally considered an application specific chipset that provides connectivity to various buses, and integrates other system functions. For example, the chipset 1010 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 1010. The chipset 1010 can also be packaged as an application specific integrated circuit (ASIC).

The information handling system 1000 can also include a video graphics interface 1022 that can be coupled to the chipset 1010 using a third host bus 1024. In one form, the video graphics interface 1022 can be an Accelerated Graphics Port (AGP) interface to display content within a video display unit 1026. Other graphics interfaces may also be used. The video graphics interface 1022 can provide a video display output 1028 to the video display unit 1026. The video display unit 1026 can include one or more types of video displays such as a flat panel display (FPD) or other type of display device.

The information handling system 1000 can also include an I/O interface 1030 that can be connected via an I/O bus 1020 to the chipset 1010. The I/O interface 1030 and I/O bus 1020 can include industry standard buses or proprietary buses and respective interfaces or controllers. For example, the I/O bus 1020 can also include a Peripheral Component Interconnect (PCI) bus or a high speed PCI-Express bus. In one embodiment, a PCI bus can be operated at approximately 66 MHz and a PCI-Express bus can be operated at more than one speed, such as 2.5 GHz and 5 GHz. PCI buses and PCI-Express buses can be provided to comply with industry standards for connecting and communicating between various PCI-enabled hardware devices. Other buses can also be provided in association with, or independent of, the I/O bus 1020 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 1010 can be a chipset employing a Northbridge/Southbridge chipset configuration (not illustrated). For example, a Northbridge portion of the chipset 1010 can communicate with the first physical processor 1002 and can control interaction with the memory 1012, the I/O bus 1020 that can be operable as a PCI bus, and activities for the video graphics interface 1022. The Northbridge portion can also communicate with the first physical processor 1002 using first bus 1004 and the second bus 1008 coupled to the $n^{th}$ physical processor 1006. The chipset 1010 can also include a Southbridge portion (not illustrated) of the chipset 1010 and can handle I/O functions of the chipset 1010. The Southbridge portion can manage the basic forms of I/O such as Universal Serial Bus (USB), serial I/O, audio outputs, Integrated Drive Electronics (IDE), and ISA I/O for the information handling system 1000.

The information handling system 1000 can further include a disk controller 1032 coupled to the I/O bus 1020, and connecting one or more internal disk drives such as a hard disk drive (HDD) 1034 and an optical disk drive (ODD) 1036 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail in the exemplary embodiments without materially departing from the novel teachings and advantages of the embodiments of the present disclosure. For example, the methods described in the present disclosure can be stored as instructions in a computer readable medium to cause a processor, such as chipset 1010, to perform the method. Additionally, the methods described in the present disclosure can be stored as instructions in a non-transitory computer readable medium, such as a hard disk drive, a solid state drive, a flash memory, and the like. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
    a hardware processor; and
    a memory device storing instructions that when executed cause the hardware processor to perform operations, the operations including:
        receiving a peripheral component interconnect (PCI) identifier sent by a device connected to a peripheral component interconnect bus;
        querying a PCI-based licensing manager for the peripheral component interconnect identifier, the PCI-based licensing manager having a datastore that electronically associates licenses to the peripheral component interconnect identifiers;
        determining that the device connected to the peripheral component interconnect bus is unlicensed in response to the PCI-based licensing manager failing to electronically associate the peripheral component interconnect identifier to any of the licenses in the datastore; and
        licensing the device connected to the peripheral component interconnect bus in response to the determining that the device is unlicensed.

2. The information handling system of claim 1 wherein the operations further comprise retrieving a license in response to the determining that the device is unlicensed.

3. The information handling system of claim 1 wherein the operations further comprise querying for a license in response to the determining that the device is unlicensed.

4. The information handling system of claim 1 wherein the operations further comprise storing the datastore.

5. The information handling system of claim 1 wherein the operations further comprise communicating with the device connected to the peripheral component interconnect bus.

6. The information handling system of claim 1 further comprising a network interface to a communications network.

7. A method comprising:
    receiving a peripheral component interconnect (PCI) identifier sent by a device connected to a peripheral component interconnect bus;
    querying a remote licensing server for the peripheral component interconnect identifier, the remote licensing server having a datastore that electronically associates licenses to peripheral component interconnect identifiers;
    determining that the device connected to the peripheral component interconnect bus is unlicensed in response to the remote licensing server failing to electronically associate the peripheral component interconnect identifier to any of the licenses in the datastore; and
    licensing the device connected to the peripheral component interconnect bus in response to the determining that the device is unlicensed.

8. The method of claim 7 further comprising retrieving a license in response to the determining that the device is unlicensed.

9. The method of claim 7 further comprising querying for a license in response to the determining that the device is unlicensed.

10. The method of claim 7 further comprising storing the datastore.

11. The method of claim 7 further comprising communicating with the device connected to the peripheral component interconnect bus.

12. The method of claim 7 further comprising assigning a time constraint to the license.

13. The method of claim 7 further comprising sending the peripheral component interconnect identifier via a network interface to a communications network.

14. A memory device storing instructions that when executed cause a hardware processor to perform operations, the operations comprising:
    receiving a peripheral component interconnect (PCI) identifier sent from a peripheral card connected to a peripheral component interconnect bus;
    querying a remote licensing server for the peripheral component interconnect identifier, remote licensing server providing a card-based licensing manager having a datastore that electronically associates licenses to peripheral component interconnect identifiers;

determining that the peripheral card connected to the peripheral component interconnect bus is unlicensed in response to the card-based licensing manager failing to electronically associate the peripheral component interconnect identifier to any of the licenses in the datastore; and licensing the peripheral card connected to the peripheral component interconnect bus in response to the determining that the peripheral card is unlicensed.

15. The memory device of claim 14, wherein the operations further comprise retrieving a license in response to the determining that the peripheral card is unlicensed.

16. The memory device of claim 14, wherein the operations further comprise querying for a license in response to the determining that the peripheral card is unlicensed.

17. The memory device of claim 14, wherein the operations further comprise storing the datastore.

18. The memory device of claim 14, wherein the operations further comprise communicating with the peripheral card connected to the peripheral component interconnect bus.

19. The memory device of claim 14, wherein the operations further comprise assigning a time constraint to the license.

20. The memory device of claim 14, wherein the operations further comprise sending the peripheral component interconnect identifier via a network interface to a communications network.

* * * * *